I. NEWMAN.
CIGAR TIP CUTTER.
APPLICATION FILED MAR. 10, 1911.
1,013,889.
Patented Jan. 9, 1912.
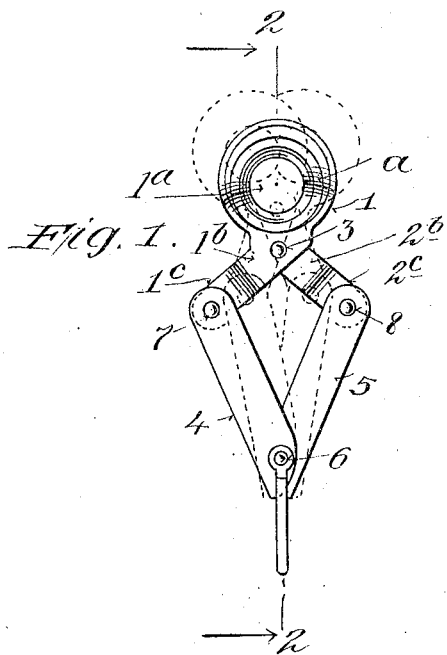
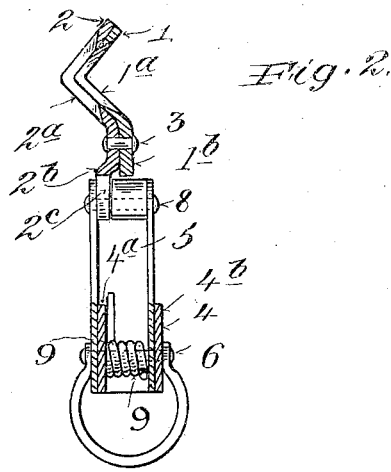
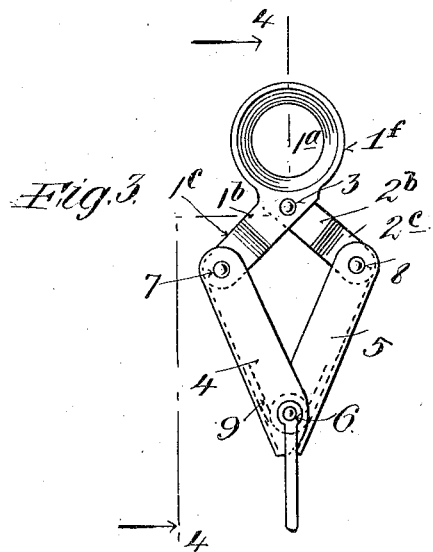
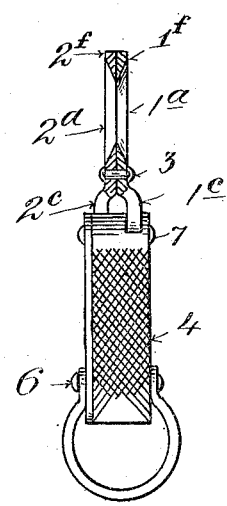
Witnesses:
Inventor
I Newman
By his Attorney

UNITED STATES PATENT OFFICE.

ISIDOR NEWMAN, OF NEW YORK, N. Y.

CIGAR-TIP CUTTER.

1,013,889.

Specification of Letters Patent. Patented Jan. 9, 1912.

Application filed March 10, 1911. Serial No. 613,519.

*To all whom it may concern:*

Be it known that I, ISIDOR NEWMAN, a citizen of the United States, and resident of New York city, borough of Bronx, in the county of New York and State of New York, have invented certain new and useful Improvements in Cigar-Tip Cutters, of which the following is a specification.

The object of my invention is to provide a simple and efficient cutter for cigar tips, wherein the cutters are normally held in position to receive the cigar tip, and by a mere pressure of the operating arms toward each other the cutters will be moved apart relatively to each other for severing the cigar tip, the device being capable of being made in relatively small size so as to be conveniently carried in the nature of a watch-chain charm.

The invention comprises novel details of improvement and combinations of parts that will be more fully hereinafter set forth and then pointed out in the claims.

Reference is to be had to the accompanying drawings forming part hereof, wherein, Figure 1 is a face view of a cigar-tip cutter embodying my invention; Fig. 2 is a section on the line 2, 2, in Fig. 1; Fig. 3 is a face view illustrating a modified form of cutters, and Fig. 4 is a section on the line 4, 4, in Fig. 3.

The numerals 1, 2, indicate the cutters, shown provided with normally alined central openings 1ª, 2ª to receive the cigar tips, the edges of such openings being suitably shaped to readily cut the cigar tips. The cutters 1, 2, are pivotally connected at 3 so as to normally lie one over or against the other, and the arms 1ᵇ, 2ᵇ of said cutters normally extend in diverging directions, and at their outer portions are shown bent laterally out of line with each other.

In Figs. 1 and 2 cutters 1, 2, are shown bent at an angle substantially midway across openings 1ª, 2ª, and are curved substantially on a circle described around the pivot 3, whereby the cutters in angular form are seated one within the other, and move relatively to each other with respect to the curve *a*. The construction enables cutting the cigar tip in a substantially V-form.

In Figs. 3 and 4 the cutters 1ᶠ, 2ᶠ, are shown flat and slide past each other in parallel planes, whereby the end of the cigar tip may be cut off transverse to the plane of the cigar. At 4, 5, are members pivotally connected together at their outer ends, at 6, the member 4 being pivotally connected at 7 with the bent portion 1ᶜ of arm 1ᵇ, and the member 5 being pivotally connected at 8 with the bent portion 2ᶜ of arm 2ᵇ. A spring 9, shown coiled around pivot 6, and bearing at its ends against members 4, 5, serves to normally maintain said members spread apart and thereby also spreading apart the arms 1ᵇ, 2ᵇ, and retaining the cutters 1, 2, in normal positions with their openings 1ª, 2ª alined. The lower ends of members 4, 5, below the pivot 6, engage and thus limit the outward or spreading movement of members 4, 5, and thereby maintain the openings 1ª, 2ª of the cutters normally alined, as illustrated in Figs. 1 and 3. The members 4, 5, are shown formed of channel-like material, the side web 4ª of one member 4 fitting within the channel of the other member 5, and the side web 4ᵇ of member 4 fitting without the corresponding web of member 5, whereby said members can be made of relatively light material and yet of considerable strength, and enabling the members to fold closely together.

Changes may be made in the arrangements set forth, within the scope of the appended claims, without departing from the spirit of the invention.

Having now described my invention what I claim is:—

1. A cigar-tip cutter comprising a pair of cutters pivotally connected together, and having outwardly extending arms, a pair of members pivotally connected at adjacent ends and respectively pivotally connected at their opposite ends with said arms, and a spring coiled about the pivot of and normally separating said members to normally hold the cutters in operating position.

2. A cigar-tip cutter provided with a pair of cutters pivotally connected together and having normally alined openings, arms extending from said cutters in diverging directions from the pivot, and members pivotally connected with said arms and pivotally connected together, and a spring coiled about the pivot of said members to normally spread them apart.

3. A cigar-tip cutter provided with a pair of cutters pivotally connected together and having normally alined openings, arms extending from said cutters in diverging directions from the pivot, members pivotally connected with said arms and pivotally connected together, and a spring coiled about the pivot of said members normally holding said arms spread apart and the openings of the cutters alined.

4. A cigar-tip cutter comprising a pair of cutters pivotally connected together and having openings normally alined and provided with arms extending in diverging directions beyond the pivot, and channel-members pivotally connected with said arms and pivotally connected together, a web of one member fitting within the channel of the other member.

5. A cigar-cutter comprising a pair of cutters pivotally connected together and having openings normally alined and provided with arms extending in diverging directions beyond the pivot, channel-members pivotally connected with said arms and pivotally connected together, a web of one member fitting within the channel of the other member, and a spring coiled around the pivot of said members, located within their channels, and normally spreading said members apart.

Signed at New York city, in the county of New York, and State of New York, this 9th day of March, A. D. 1911.

ISIDOR NEWMAN.

Witnesses:
T. F. BOURNE,
RALPH H. RAPHAEL.